(12) United States Patent
Canoy et al.

(10) Patent No.: US 8,570,880 B2
(45) Date of Patent: Oct. 29, 2013

(54) METHOD AND APPARATUS FOR RECEIVING BROADCAST IN A WIRELESS MULTIPLE-ACCESS COMMUNICATIONS SYSTEM

(75) Inventors: Michael-David Nakayoshi Canoy, San Diego, CA (US); Parag Arun Agashe, San Diego, CA (US); Qiang Wu, San Diego, CA (US); Ramakrishna Kintada, San Diego, CA (US); Senthilkumar Kaliannan Sundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 10/913,068

(22) Filed: Aug. 5, 2004

(65) Prior Publication Data

US 2006/0028995 A1    Feb. 9, 2006

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| H04J 3/26 | (2006.01) |
| H04N 7/16 | (2011.01) |
| H04N 7/173 | (2011.01) |

(52) U.S. Cl.
USPC ............... 370/252; 370/390; 370/432; 725/1; 725/87

(58) Field of Classification Search
USPC .............. 370/332, 333, 230, 310.2, 313, 329
See application file for complete search history.

(56) References Cited

U.S. PATENT DOCUMENTS

| | | | |
|---|---|---|---|
| 4,424,565 A | 1/1984 | Larson | |
| 4,521,806 A | 6/1985 | Abraham | |
| 4,901,307 A | 2/1990 | Gilhousen et al. | |
| 5,091,905 A | 2/1992 | Amada | |
| 5,103,459 A | 4/1992 | Gilhousen et al. | |
| 5,267,261 A | 11/1993 | Blakeney, II et al. | |

(Continued)

FOREIGN PATENT DOCUMENTS

| | | |
|---|---|---|
| EP | 1006746 A2 | 6/2000 |
| EP | 1085660 | 3/2001 |

(Continued)

OTHER PUBLICATIONS

3GPP2-C.S0002-C v3.0, "Physical Layer Standard for cdma2000 Spread Spectrum Systems", (TR 45.5), Jun. 2001.

(Continued)

*Primary Examiner* — Xavier S. Wong
(74) *Attorney, Agent, or Firm* — James T. Hagler

(57) ABSTRACT

An access terminal an a wireless multiple-access network monitors multiple broadcast soft handoff groups simultaneously in order to select the best logical broadcast channels to decode based upon broadcast contents selected by a user of the access terminal. When in a traffic state the access terminal is able to decode one or more broadcast channels by decoding a unicast channel from a traffic server during one time slot and then decoding a broadcast channel from a broadcast server during another time slot.

42 Claims, 4 Drawing Sheets

(56) References Cited

U.S. PATENT DOCUMENTS

| | | | |
|---|---|---|---|
| 5,504,773 A | 4/1996 | Padovani et al. | |
| 5,548,814 A | 8/1996 | Lorang et al. | |
| 5,594,718 A | 1/1997 | Weaver et al. | |
| 5,642,398 A | 6/1997 | Tiedemann, Jr. et al. | |
| 5,678,184 A | 10/1997 | Cutler, Jr. et al. | |
| 5,722,044 A | 2/1998 | Padovani et al. | |
| 5,812,540 A | 9/1998 | Bruckert et al. | |
| 5,844,620 A | 12/1998 | Coleman et al. | |
| 5,873,043 A | 2/1999 | Comer | |
| 5,909,651 A | 6/1999 | Chander et al. | |
| 5,933,787 A | 8/1999 | Gilhousen et al. | |
| 5,974,320 A | 10/1999 | Ward et al. | |
| 6,032,205 A | 2/2000 | Ogimoto et al. | |
| 6,049,323 A | 4/2000 | Rockwell et al. | |
| 6,055,428 A * | 4/2000 | Soliman | 455/437 |
| 6,108,706 A | 8/2000 | Birdwell et al. | |
| 6,122,514 A | 9/2000 | Spaur et al. | |
| 6,178,446 B1 | 1/2001 | Gerszberg et al. | |
| 6,233,455 B1 | 5/2001 | Ramakrishna et al. | |
| 6,272,117 B1 | 8/2001 | Choi et al. | |
| 6,337,983 B1 | 1/2002 | Bonta et al. | |
| 6,344,882 B1 | 2/2002 | Shim et al. | |
| 6,351,656 B1 | 2/2002 | Burgan et al. | |
| 6,393,282 B1 | 5/2002 | Iimori | |
| 6,400,946 B1 | 6/2002 | Vazvan et al. | |
| 6,434,389 B1 | 8/2002 | Meskanen et al. | |
| 6,434,390 B2 | 8/2002 | Rahman | |
| 6,452,644 B1 | 9/2002 | Shimakawa et al. | |
| 6,462,671 B2 | 10/2002 | Bushner et al. | |
| 6,477,157 B1 | 11/2002 | Kim et al. | |
| 6,505,160 B1 | 1/2003 | Levy et al. | |
| 6,526,027 B1 | 2/2003 | Yeom | |
| 6,539,030 B1 | 3/2003 | Bender et al. | |
| 6,542,742 B2 * | 4/2003 | Schramm et al. | 455/436 |
| 6,556,131 B1 | 4/2003 | Besharat et al. | |
| 6,574,211 B2 | 6/2003 | Padovani et al. | |
| 6,584,087 B1 | 6/2003 | Czaja et al. | |
| 6,594,498 B1 | 7/2003 | McKenna et al. | |
| 6,681,114 B2 | 1/2004 | Chang et al. | |
| 6,697,651 B2 | 2/2004 | Li | |
| 6,704,328 B1 | 3/2004 | Khaleghi et al. | |
| 6,747,962 B2 | 6/2004 | Lintulampi et al. | |
| 6,785,551 B1 | 8/2004 | Richard | |
| 6,829,486 B2 | 12/2004 | McKenna et al. | |
| 6,845,104 B2 | 1/2005 | Johnson et al. | |
| 6,904,611 B1 | 6/2005 | Poli et al. | |
| 6,940,421 B2 | 9/2005 | Chamberlain et al. | |
| 6,985,779 B2 | 1/2006 | Hsiung et al. | |
| 6,993,000 B2 * | 1/2006 | Famolari | 370/332 |
| 7,035,383 B2 | 4/2006 | O'Neal | |
| 7,054,660 B2 | 5/2006 | Lord | |
| 7,061,880 B2 * | 6/2006 | Basilier | 370/312 |
| 7,142,860 B2 | 11/2006 | Mildh et al. | |
| 7,231,399 B1 * | 6/2007 | Bem et al. | 707/102 |
| 7,236,788 B2 * | 6/2007 | Mohebbi | 455/437 |
| 7,246,365 B2 | 7/2007 | Lee | |
| 7,254,394 B2 | 8/2007 | Chen et al. | |
| 7,277,407 B2 * | 10/2007 | Kim et al. | 370/328 |
| 7,293,094 B2 * | 11/2007 | Vaman et al. | 709/227 |
| 7,346,374 B2 | 3/2008 | Witkowski et al. | |
| 7,359,715 B2 | 4/2008 | Choksi | |
| 7,411,901 B1 * | 8/2008 | Alexander et al. | 370/230 |
| 7,415,283 B2 | 8/2008 | Sinnarajah et al. | |
| 7,689,226 B2 | 3/2010 | Sinnarajah et al. | |
| 7,912,485 B2 | 3/2011 | Sinnarajah et al. | |
| 7,937,086 B2 | 5/2011 | Chen et al. | |
| 2001/0017851 A1 | 8/2001 | Yamaguchi et al. | 370/332 |
| 2002/0010789 A1 | 1/2002 | Lord | |
| 2002/0032024 A1 | 3/2002 | Namba et al. | |
| 2002/0046407 A1 | 4/2002 | Franco | |
| 2002/0087797 A1 * | 7/2002 | Adrangi | 711/133 |
| 2002/0169885 A1 | 11/2002 | Alao et al. | |
| 2002/0174439 A1 | 11/2002 | Akiyama et al. | |
| 2002/0194607 A1 * | 12/2002 | Connelly | 725/87 |
| 2003/0036384 A1 * | 2/2003 | Chen et al. | 455/437 |
| 2003/0054807 A1 | 3/2003 | Hsu et al. | |
| 2003/0072269 A1 * | 4/2003 | Teruhi et al. | 370/252 |
| 2003/0073441 A1 * | 4/2003 | Fattouch | 455/446 |
| 2003/0078044 A1 | 4/2003 | Leung | |
| 2003/0114177 A1 | 6/2003 | Sinnarajah et al. | |
| 2003/0134622 A1 | 7/2003 | Hsu et al. | |
| 2003/0157949 A1 | 8/2003 | Sarkkinen et al. | |
| 2004/0085909 A1 | 5/2004 | Soliman | |
| 2004/0125740 A1 | 7/2004 | Gardner | |
| 2004/0198371 A1 | 10/2004 | Balasubramanian et al. | |
| 2004/0203816 A1 | 10/2004 | Bae et al. | |
| 2005/0053023 A1 | 3/2005 | Rajkotia et al. | |
| 2005/0054331 A1 | 3/2005 | Balachandran et al. | |
| 2005/0063340 A1 * | 3/2005 | Hoffmann et al. | 370/332 |
| 2005/0075107 A1 | 4/2005 | Wang et al. | |
| 2005/0157669 A1 | 7/2005 | Zhu et al. | |
| 2005/0243744 A1 | 11/2005 | Tan | |
| 2007/0061845 A1 | 3/2007 | Barnes | |
| 2008/0216106 A1 * | 9/2008 | Maxwell et al. | 725/1 |
| 2011/0170470 A1 | 7/2011 | Sinnarajah et al. | |

FOREIGN PATENT DOCUMENTS

| | | |
|---|---|---|
| EP | 1109418 A2 | 6/2001 |
| EP | 1 189 469 A2 | 3/2002 |
| JP | 10509293 T | 9/1998 |
| JP | 11501783 | 2/1999 |
| JP | 11-069437 | 3/1999 |
| JP | 2000-224648 | 8/2000 |
| JP | 2000-312371 | 11/2000 |
| JP | 2001-069549 | 3/2001 |
| JP | 2002501706 A | 1/2002 |
| JP | 2002095405 A | 4/2002 |
| JP | 20020095045 | 11/2002 |
| JP | 2003518889 A | 6/2003 |
| KR | 199932845 | 12/1999 |
| KR | 20010053883 | 7/2001 |
| KR | 2003-48502 | 6/2003 |
| RU | 2155451 | 8/2000 |
| WO | 9610895 | 4/1996 |
| WO | WO9616524 A2 | 5/1996 |
| WO | WO9628947 | 9/1996 |
| WO | WO9833288 | 7/1998 |
| WO | WO9854919 A2 | 12/1998 |
| WO | WO9925137 A1 | 5/1999 |
| WO | WO99027718 | 6/1999 |
| WO | 9935778 A2 | 7/1999 |
| WO | 9952304 | 10/1999 |
| WO | 0027158 | 5/2000 |
| WO | 0110146 | 2/2001 |
| WO | 0139577 A1 | 6/2001 |
| WO | WO0149061 | 7/2001 |
| WO | 0247417 A1 | 6/2002 |
| WO | WO03017693 | 2/2003 |
| WO | 03026181 A1 | 3/2003 |
| WO | WO03037030 | 5/2003 |
| WO | WO03063418 A1 | 7/2003 |
| WO | WO03071725 A2 | 8/2003 |
| WO | 2004039002 | 5/2004 |

OTHER PUBLICATIONS

TIA/EIA/IS-856, "cdma2000 High Rate Packet Data Air Interface Specification," version 2.0, Oct. 27, 2000.

TIA/EIA/IS-95, "Mobile Station-Base Station Compatibility Standard for Dual-Mode Wideband Spread Spectrum Cellular System", Jul. 1993.

3GPP TS 25.211 V6.1.0 (Jun. 2004): 3rd Generation Partnership Project; Technical Specification Group Radio Access Network; Physical channels and mapping of transport channels onto physical channels (FDD)(Release 6).

3GPP TS 25.212 V6.2.0 (Jun. 2004): 3rd Generation Partnership Project; Technical Specification Group Radio Access Network; Multiplexing and channel coding (FDD)(Release 6).

3GPP TS 25.213 v6.0.0 (Dec. 2003) 3rd Generation Partnership Project; Technical Specification Group Radio Access Network; Spreading and Modulation (FDD) (Release 6).

(56) References Cited

OTHER PUBLICATIONS

3GPP TS 25.214 v6.2.0 (Jun. 2004) 3rd Generation Partnership Project; Technical Specification Group Radio Access Network; Physical Layer Procedures (FDD) (Release 6).
Chen, U.S. Appl. No. 60/279,970, "Method and Apparatus for Group Calls Using Dedicated and Common channels in Wireless Networks," Mar. 28, 2001.
European Search Report—EP09171011, Search Authority—Munich Patent Office, Nov. 4, 2009.
European Search Report—EP10009638, Search Authority—Munich Patent Office, Nov. 30, 2010.
SWG2.3 BCMCS ADHOC: "Signaling Support for 1X BCMCS" 3GPP2, Aug. 28, 2003, pp. 1-53, XP002315846.
TIA/EIA/IS-95 "Mobile Station-Base Station Compatibility Standard for Dual-Mode Wideband Spread Spectrum Cellular System" Jul. 1993.
TR 45.5 3GPP2 C.S0002-C Version 1.0; (May 28, 2002); Physical Layer Standard for cdma 2000; Spread Spectrum Systems (Release C).
Written Opinion—PCT/US2005/027640, International Search Authority, European Patent Office, Nov. 25, 2005.
International Search Report—PCT/US05/027640, International Search Authority, European Patent Office—Nov. 25, 2005.
"Digital cellular telecommunications system (Phase 2+); (GSM) Universal Mobile Telecommunications System (UMTS): General Packet Radio Service (GRPS) Service description; Stage 2 (3GPP TS 23.060 Ver. 3.8.0 Rel. 1999)," ETSI TS 123 060 Ver. 3.8.0, Jun. 1, 2001, pp. 134-135.
"Digital cellular telecommunications system (Phase 2+); Technical realization of Short Message Service Cell Broadcast (SMSCB) (GSM 03.41 Ver. 5.8.1)," European Telecommunication Standard, 4th Ed. No. ETS 300 902, Jun. 1998, pp. 1-30.
"Digital cellular telecommunications system (Phase 2+); Voice Broadcast Service (VBS); Stage 2 (GSM 03.69 Ver. 7.0.0 Rel. 1998)," ETSI TS 100 934, Ver. 7.0.0, Aug. 1, 1999, pp. 19-20.
ETSI TS 125 211 v4.1.0; "Universal Mobile Telecommunications System (UMTS); Physical channels and mapping of transport channels onto physical channels (FDD)", 3GPP TS 25.211 version 4.1.0 Release 4 (Jun. 2001).
ETSI TS 125 212 v4.1.0; "Universal Mobile Telecommunications System (UMTS); Multiplexing and channel coding (FDD)", 3G TS 25.212 version 4.1.0 Release 4 (Jun. 2001).
ETSI TS 125 213 v4.1.0; "Universal Mobile Telecommunications System (UMTS); Spreading and modulation (FDD)", 3G TS 25.213 version 4.1.0 Release 4 (Jun. 2001).
ETSI TS 125 214 v4.1.0; "Universal Mobile Telecommunications System (UMTS); Physical layer procedures (FDD)", 3G TS 25.214 version 4.1.0 Release 4 (Jun. 2001).
European Search Report—EP10177725—Search Authority—Munich —Feb. 28, 2011.
Sinnaraja R., "1xBCMCS—BSPM Deployment Options", C23-BCMCAHG-20030915-003(QCOM-BSPM deployment-options), 3GPP2, Sep. 16, 2003.
Sinnarajah, R., "1xBCMCS Overview of cdma2000 L2/L3 Design", C23-20030512-013 (1xBCMCS-L2-L3-Design), 3GPP2, May 12, 2003.
Sinnarajah, R., et al., "1x Broadcast Service Overview of cdma2000 L2/L3 Design", C23-20020708-010_Qualcomm_C23-20020610-002R1 (Broadcast-Service-cdma2000-L2-L3-Design)-2, 3GPP2, Jul. 16, 2002.
Sinnarajah, R., et al., "1x Broadcast Service Overview of cdma2000 L2/L3 Design", C23-20020708-010R1_Qualcomm_C23-20020708-010-R1 (Broadcast-Service-cdma2000-L2-L3-Design), 3GPP2, Aug. 7, 2002.
Zou, X., et al., "Dedicated mode (on traffic channel) BCMCS", C23-20030818-020 (CCSA_BCMCS_on_traffic_channel)-2, 3GPP2, Aug. 21, 2003.

* cited by examiner

METHOD AND APPARATUS FOR RECEIVING BROADCAST IN A WIRELESS MULTIPLE-ACCESS COMMUNICATIONS SYSTEM

REFERENCE TO CO-PENDING APPLICATIONS FOR PATENT

The present Application for Patent is related to the following co-pending U.S. Patent Applications:

U.S. Publication No. 2003/0036384, filed Aug. 20, 2001 and published Feb. 20, 2003, for "Method and System for Handoff in a Broadcast Communication System;" and U.S. Publication No. 2003/0114177, filed Aug. 20, 2001 and published Jun. 19, 2003, for "Method and System for Signaling in a Broadcast Communication System."

BACKGROUND

1. Field

An access terminal in a wireless multiple-access communications system selects a source of broadcast content from among multiple sources of multiple contents.

2. Background

Wireless multiple-access communications systems are being adapted by means of developing data transmission standards and products designed to meet the demand for high-speed data services. As services provided by wireless systems expand to embrace high-speed data services, the expectation is that users will demand access to program information otherwise made available by broadcasting in other multiple user communications systems. This demand may be satisfied in a wireless system by broadcasting content on high-speed data channels reserved for such use. Cellular users would be able to select among various wireless broadcast channels in order to receive programming on cellular devices. Thus, in addition to the usual voice and text messaging services, a cellular user might also elect to receive a channel of sports programming, or a specific sports event on an identified sports programming channel, on a cellular device.

The proliferation of programming subject matter available from a plurality of wireless broadcast channels allows users to maintain wireless broadcast channel links to selected programming content and to navigate through and select from a set of programs preferred by the user. There is a need therefore, to provide maximum convenience to the user, wherein the access terminal evaluates the quality of the available wireless broadcast channels carrying the selected contents and select the best source of the contents from among the available wireless broadcast channels based upon that quality. Additionally, there is a desire for access terminal ability to control which wireless broadcast channels it attempts to decode. Further, it is desirable when in a traffic state, for the access terminal to decode wireless broadcast channels while also decoding a set of traffic channels to engage in communications.

DETAILED DESCRIPTION

Figure 1:
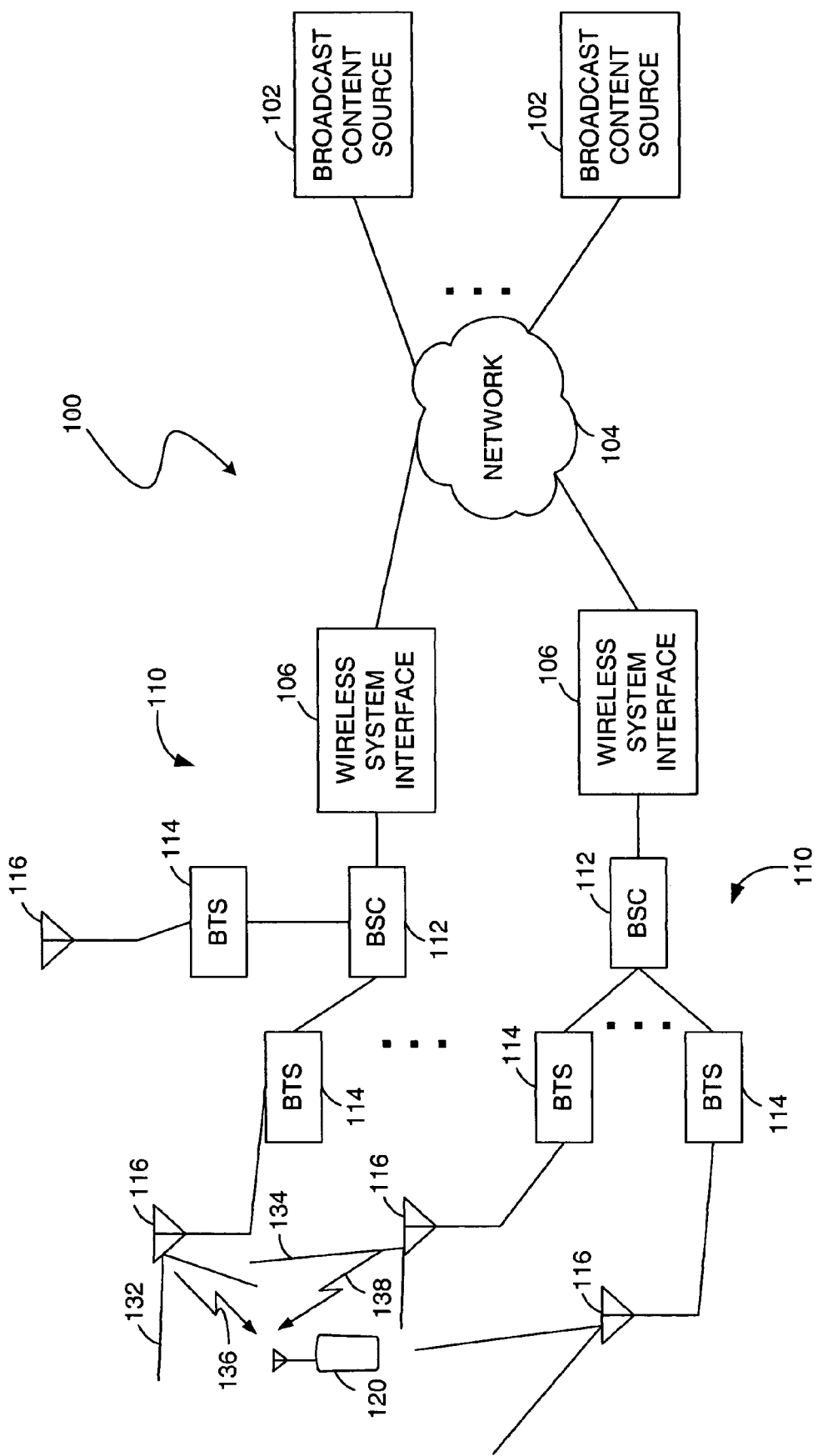
FIG. 1 is a diagram of a wireless multiple-access communications system that supports wireless communications for a number of users.

Wireless multiple-access communications systems (hereinafter, "wireless systems") are being adapted by means of developing data transmission standards and products designed to meet the demand for high-speed data services. For example, providers of Code Division-Multiple access ("CDMA") cellular services recently adopted the 1×EV-DO standard for sending and receiving high-speed packet-switched data. Other high-speed standards include the TIA/EIA/IS-856 standard defining High Data Rate (HDR) or High Rate Packet Data (HRPD) cellular communications, and the evolving 1×EV-DV standard combining voice with even higher data rates. Products and services are being quickly developed to implement the emerging high-speed data standards for wireless systems.

As services provided by wireless systems expand to embrace high-speed data services, the expectation is that users will demand access to program information otherwise made available by broadcasting in other multiple user communications systems. This demand may be satisfied in a wireless system by broadcasting content on high-speed data channels reserved for such use. For example, a cellular system may provide multiple 1×EV-DO (or equivalent) channels of programming to users on a broadcast basis; each of these channels may be termed a "wireless broadcast channel." Cellular users would be able to select among various wireless broadcast channels in order to receive programming on cellular devices. Thus, in addition to the usual voice and text messaging services, a cellular user might also elect to receive a channel of sports programming, or a specific sports event on an identified sports programming channel, on a cellular device.

A proliferation of programming subject matter available from a plurality of wireless broadcast channels will enable the users of access terminals to maintain wireless broadcast channel links to selected programming content and to navigate through and select from a set of programs preferred by the user. For example, a user may elect to maintain links to a baseball game, a stock reporting service, and a congressional news conference on an access terminal while the user moves within the wireless system. It will be the case that the same program content (the baseball game, for example) will be available on more than one wireless broadcast channel. It will further be the case that multiple Radio Frequency (RF) links providing the channels carrying the selected contents will be encountered and monitored by the user's access terminal as the user moves through the wireless system.

In order to provide maximum convenience to the user, the access terminal should evaluate the quality of the available wireless broadcast channels carrying the selected contents and select the best source of the contents from among the available wireless broadcast channels based upon that quality. Thus, there will be times when an access terminal will need to control which wireless broadcast channels it attempts to decode. Further, when in a traffic state, the access terminal should be able to decode wireless broadcast channels while also decoding a set of traffic channels to engage in communications.

In one aspect, an access terminal monitor multiple broadcast soft handoff groups simultaneously in order to evaluate and rank the best broadcast channels to decode based upon contents selected by a user of the access terminal.

In another aspect, an access terminal in a traffic state is able to evaluate and rank one or more broadcast channels while in a traffic state by decoding a unicast channel from a traffic server during one time slot and then decoding a broadcast channel from a broadcast server during another time slot.

In this specification, a wireless multiple-access network ("wireless network") includes infrastructure for receiving and serving requests for access to a network in order to provide users with the capability to communicate with other users of the network and/or with other users of other networks. Increasingly, wireless networks also provide users with access to services from sources in the network and/or other networks. Network access is provided to an access terminal such as a mobile phone, computer, personal digital assistant, or other equivalent devices, by point-to-point communications between the access terminal and one or more access nodes of the wireless network. Such networks have been deployed or will be deployed, or will be adapted with protocols and equipment for broadcasting to access terminals by way of wireless broadcasting channels. A wireless broadcasting channel is a wireless system channel that is accessible to any one or more access terminals for receipt of subject matter by way of the channel. A wireless broadcasting channel has "content, wherein content of a wireless broadcast channel is the subject matter or substance of the broadcast; that is to say, content is what a wireless broadcast channel that is broadcasting something is broadcasting.

Broadcast content is provided in a wireless network in various forms by servers. In this specification, "a server" is a physical resource in a wireless network that provides a service for access terminals in the wireless network.

For the purposes of illustration and example, a wireless system may be embodied in a CDMA cellular system in which access terminals include cellular devices and the wireless system infrastructure includes base stations, each with an area of coverage divided into sectors. A CDMA cellular system includes physical channels and logical channels. As used herein, a physical channel has two components: "an RF frequency and a code sequence." A logical channel on a forward link (from the wireless system to an access terminal) corresponds to one of 64 Walsh codes. A logical forward link traffic channel carries information (voice or data) to an access terminal. Adaptation of the protocols and layers of a CDMA wireless system for broadcasting to access terminals on high speed forward link traffic channels may be undertaken according to the teachings of U.S. Pat. No. 6,539,030.

In FIG. 1, a wireless multiple-access system is embodied in a CDMA system 100. This is intended to illustrate a wireless system with a concrete example; it is not intended to limit the application of the principles to be explained in this specification, or the scope of the claims appended hereto. In addition to the usual services provided by such a system, the system 100 is also capable of broadcasting a plurality of wireless broadcast channels on respective logical forward-link channels. The broadcast content for each wireless broadcast channel originates from one or more broadcast content sources 102. Each of the content sources 102 provides one or more content streams, each for broadcasting in a respective wireless broadcast channel. A content source may be located within or outside of the wireless network 104. Each stream of content is provided as a stream of data packets to a wireless system interface 106 with packet-serving capability. Each wireless system interface 106 provides one or more content streams to one or more base stations 110. Each base station includes a Base Station Controller (BSC) 112 with packet-switching logic that selects and places one or more packet streams on respective logical forward-link channels for broadcast. Each base station controller is connected to one or more Base Transceiver Stations (BTS) 114, each operating through a respective cellular antenna array 116 for communications with Access Terminals (AT) according to a cellular protocol. One access terminal is indicated by reference numeral 120.

Each base transceiver station 114 controls a plurality of sectors. A sector is a transmission space subtended by a cellular antenna array. Typically in a CDMA cellular system, a base station controls three or six sectors depending upon the configuration of the cellular antenna array through which it operates. In FIG. 1 the access terminal 120 is positioned to receive communications from at least two sectors 132 and 134. In this example, the sector 132 communicates a wireless broadcast channel 136 and that the sector communicates another wireless broadcast channel 138, and that at least these two broadcast channels may be received by the access terminal 120. For this specification, the sector 132 is a physical resource of the system 100 that provides the wireless broadcast channel 136 on a physical channel with a Radio Frequency (RF) component and is therefore a "server". In this specification, such a sector is a "serving server." Since the channels transmitted from a sector are provided, at the logical level, from the base transceiver station controlling the sector, a base transceiver station may be considered to be a "broadcast server."

Figure 2:
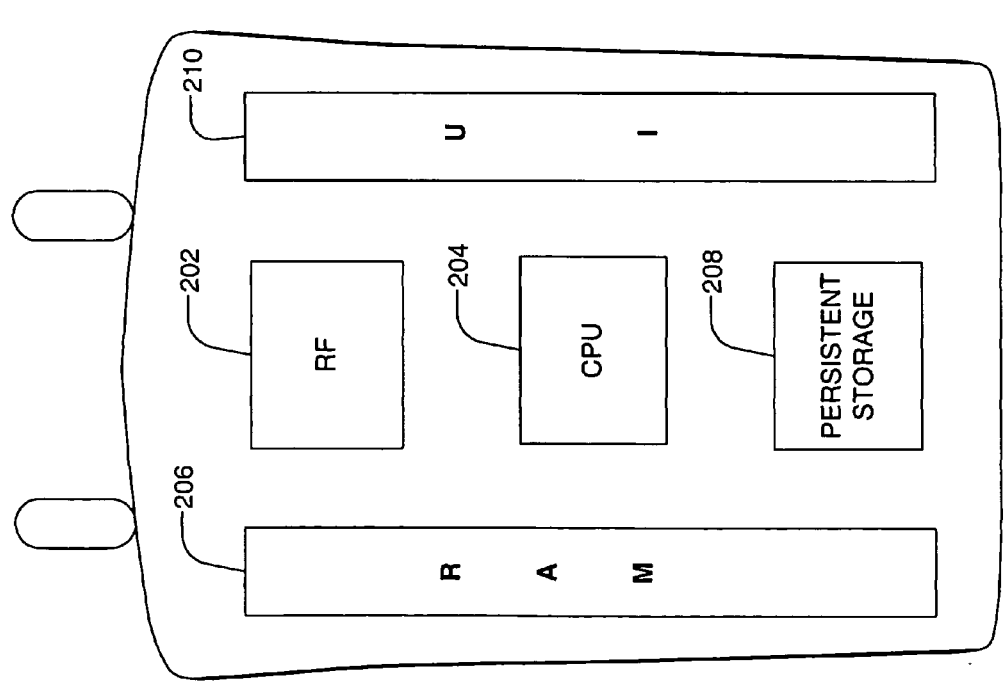
FIG. 2 is a block diagram of access terminal architecture.

FIG. 2 is a block diagram illustrating the architecture 200 of an access terminal. The access terminal architecture 200 is representative of a plurality of access terminals used in the system 100 (such as the access terminal 120) which support both conventional cellular operation and wireless broadcast reception by detection and management of one or more wireless broadcast channels. For example, the access terminal can be a cellular device such as a cellular telephone. The access terminal architecture 200 includes an RF section 202 for receiving and transmitting RF signals, a Central Processing Unit (CPU) 204 for performing various logical and mathematical operations, a random access memory 206 for storing results and code produced and/or used by the CPU 204, and a persistent storage 208 for storing programs to perform the functions and implement protocols used for cellular operation including reception and transmission on designated channels, decoding of data on forward link channels and detection, decoding and management of wireless broadcast channels. A User Interface (UI) 210 including an alphanumeric key set, additional functional keys, a speaker, and a display, (none shown), permits a user to operate an access terminal so as to send and receive communications, including broadcast content. Also included in the architecture 200 but not shown is a menu-driven Graphical User Interface (GUI) provided through the display that enables a user of the access terminal to navigate through and select various options for inputting data and commands and for selecting data including broadcast content and performances.

Using the user interface 210, the user may enter information identifying and prioritizing selected broadcast content. Successive entries enable the user to identify a plurality of selected broadcast contents and to designate them in order of preference. Further, the user may also identify specific performances in a selected broadcast content. That is to say, the user may enter a preference for a certain baseball game at a certain time on a certain day (the performance) on a selected sports channel (the broadcast content). Of course, the user may elect to simply monitor the sports channel without reference to specific performances.

As the user moves through the cellular system of FIG. 1, an access terminal with the architecture 200 may decode one or more wireless broadcast channels on which the selected broadcast contents and selected performances are provided. At any time, there will be a "best serving server"; for example, in the example of this specification, a sector having the best physical channel providing a selected broadcast content to the access terminal. At the same time there will be a "best broadcast server" which, in this example, could be a base transceiver station providing the logical channel with the highest priority broadcast content. Manifestly, it could be the case that the best serving server and the best broadcast server are not connected and the highest priority broadcast content is provided from a sector with on a lower quality RF signal than that provided by the best serving server. In such a case, management of broadcast channel decoding could simply default to a quality measurement favoring RF signal quality, meaning that among the broadcast content selected, the access terminal would decode the signal from the sector broadcasting selected broadcast content on the best RF channel. However, there are times when it will be advantageous for the access terminal to decode broadcast content from a server that is not the best serving server.

Physical channel reception and quality may be improved by a scheme supporting a "soft combine group", that is, a set of one or more serving servers (sectors, in this example) monitored by the access terminal that transmit the same selected broadcast content at the same time on the same physical channel where the energy of the set can be combined. The access terminal maintains and manages soft combine groups, and may select a transmission from one of the serving servers or may combine the signal energy of two or more members of the group for decoding broadcast content. The access terminal may monitor several broadcast servers at once to determine which broadcast server has the "best content" and then may receive and decode the best content from a physical channel provided by a soft combine group associated with that broadcast server. The broadcast server with the "best content" is the best broadcast server, and is determined by an algorithm illustrated in FIGS. 3 and 4 and by the pseudo-code in Table I. This algorithm accounts for the both the signal quality and the priority of identified broadcast contents available from all monitored broadcast servers and their associated soft combine groups.

Figure 3:
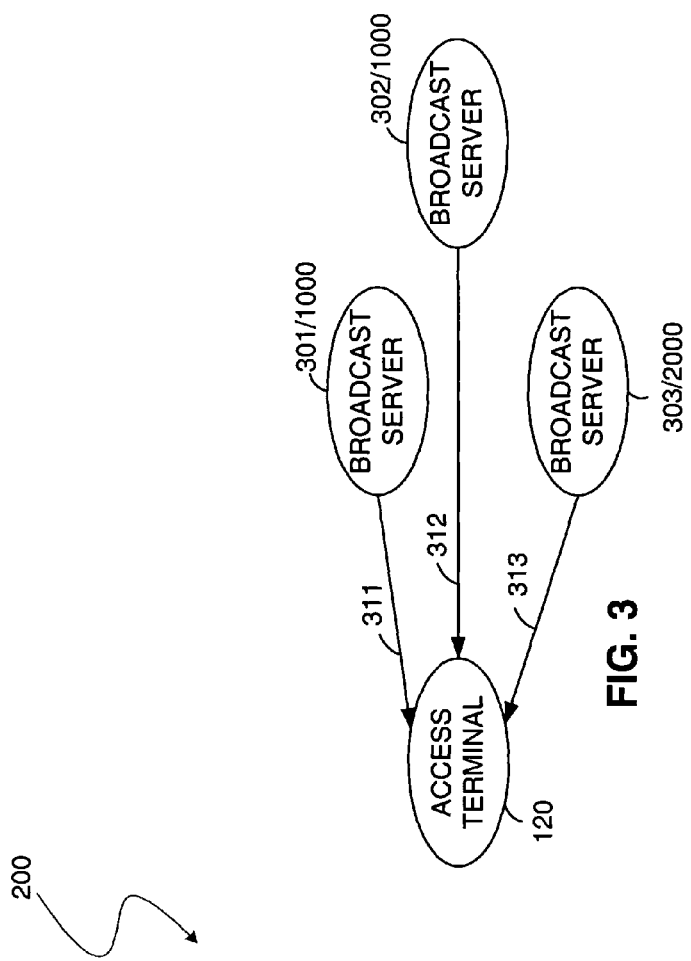
FIG. 3 is a diagram of a wireless broadcast environment in which an access terminal performs a process for evaluating and ranking broadcast servers.

FIG. 3 illustrates the environment in which the selection process for a best broadcast server in the presence of soft combine groups is conducted. The reference numbers 301, 302, and 303 identify different broadcast servers. The numerals 1000 and 2000 represent different soft-combine groups which are associated with one or more broadcast servers. The broadcast servers 301 and 302, for example, are associated with the soft combine group 1000, while the broadcast server 303 is associated with the soft combine group 2000. That is to say, the broadcast servers 301 and 302 have at least one wireless broadcast channel in common that is monitored by an access terminal from serving servers connected to the broadcast servers. The broadcast server 303 provides one or more wireless broadcast channels not broadcast by either of the broadcast servers 301 and 302. The RF links 311, 312, and 313 carry wireless broadcast channels to the access terminal 120 from the broadcast servers 301, 302, and 303, respectively.

Figure 4:
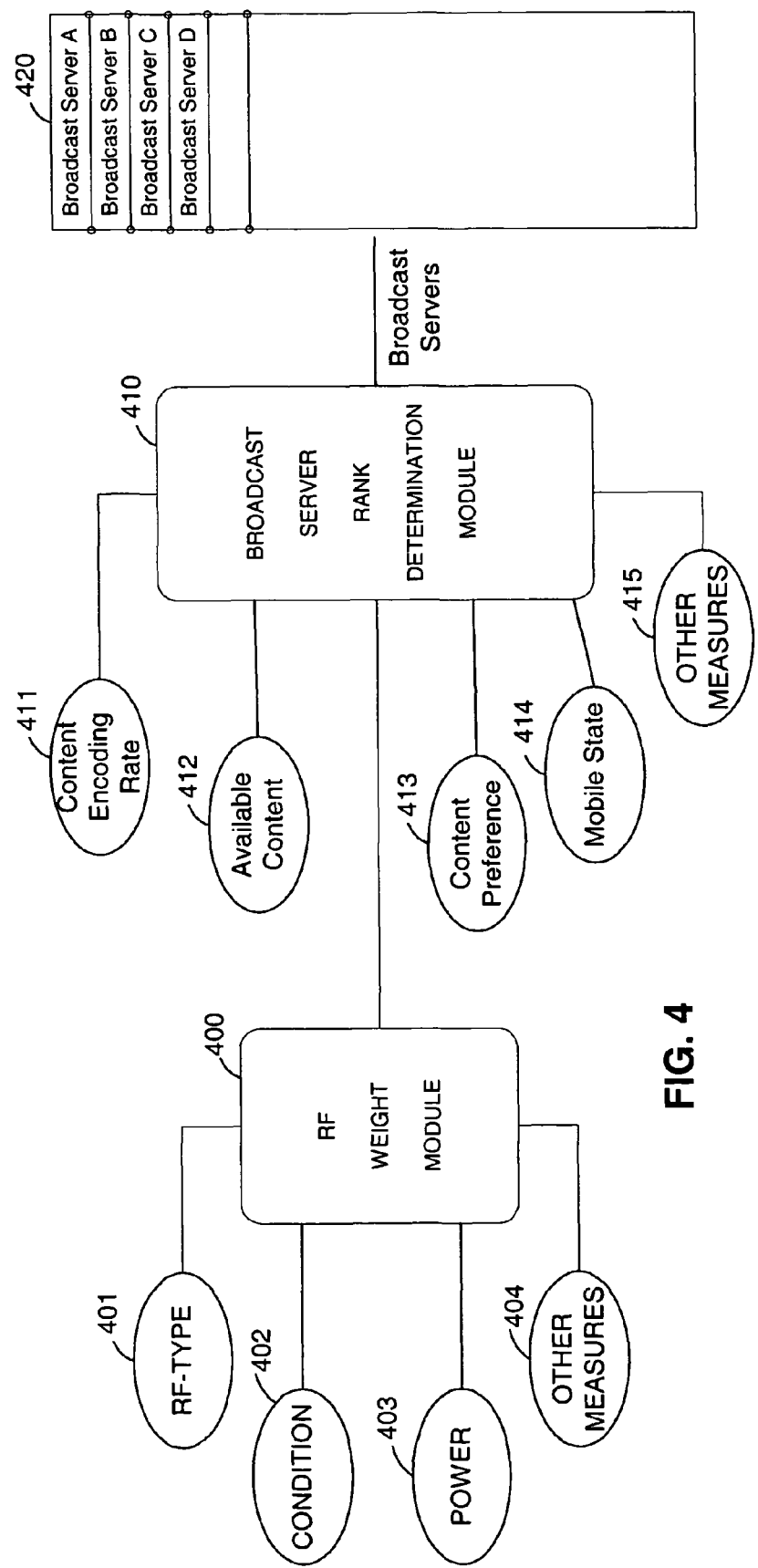
FIG. 4 is a block diagram of the process for evaluating and ranking broadcast servers.

FIG. 4 and the pseudo-code of Table I illustrate a process for operating an access terminal to evaluate and rank broadcast content. The process is preferably performed by an access terminal in a wireless multiple-access system, such as the access terminal 120 architected as illustrated in FIG. 2, which may be operating, for example, in a CDMA cellular system such as illustrated in FIG. 1. Manifestly, the process may be embodied in a software program stored in a persistent storage and executed by a digital processor on board the access terminal, or by an automated procedure implemented in a customized processor on board the access terminal.

According to the method broadcast servers are evaluated and ranked based upon the broadcast contents they are serving and the quality of the RF channels providing the broadcast contents and transmitted by the serving servers of soft combine groups. The method iterates through broadcast servers which are serving broadcast content. In this regard, "broadcast content" refers to a flow of content on a channel that is broadcast over the air from a server to all access terminals that can receive the content. Broadcast content comprises information of interest to a user together with administrative information identifying the content. For example, a broadcast server may be a base transceiver station serving sports programming as a broadcast content on a logical channel provided on a high-speed forward link data channel. The broadcast content may be provided by serving servers embodied as sectors operated by the base transceiver station by way of a physical channel transmitted in each sector. A soft combine group of serving servers may be a group of sectors providing the physical channel and monitored by the access terminal.

The process for operating an access terminal to evaluate and rank broadcast content is embodied in FIG. 4 in two functional modules and a data structure. An RF weight module 400 evaluates the RF signal component of a physical channel served from a sector according to measures of quality such as RF type 401 (such as CDMA), the condition of the RF condition 402 (signal to noise ratio, for example), and a mean power 403 of the RF signal, and other relevant measures 404. The measures of quality are combined to produce the weight for an RF channel carrying broadcast content from a sector (WRF). A broadcast server rank determination module 410 determines a weight for each broadcast server of the set of broadcast servers monitored by the access terminal and serving broadcast content identified by the user of the access terminal. The weight for each broadcast server (WBroadcastServer) in this set is determined by determining a weight for each broadcast content (WContent) identified by the user that is served by the broadcast server. The module 410 uses measures of quality of the content to determine the weight for the content. Such measures may include, for example, WRF for the content, encoding rate 411, available content 412, content preference 413, the state of the mobile state 414 (idle or connected), and other equivalent measures 415. The broadcast server weights are used to rank the broadcast servers A-D (BroadcastServerRank) of the set in the data structure 420. The best broadcast server has the highest rank. The access terminal may decode a wireless broadcast channel provided by the best broadcast server for presentation to the user by way of the access terminal's user interface.

An access terminal may conduct the process for evaluating and ranking broadcast servers as follows. Each broadcast server to be evaluated and ranked (Broadcast Server[j]) provides at least one wireless broadcast channel monitored by the access terminal. Note, an example o pseudo-code is provided hereinbelow. Each broadcast content provided by Broadcast Server[j] and monitored by the access terminal (Content[i]) is received on a hysical channel provided from a serving server (a sector). Therefore, a soft combine group of one or more soft combine servers exists, each providing the physical channel monitored by the access terminal. The RF component of the physical channel provided by servers of the soft combine group for Content[i] is evaluated and assigned a weight (WRF[k]) by the module 400. These weights are combined to yield WRF[k], a combined weight for those serving servers (sectors) of a soft combine group monitored by the access terminal which provide transmissions of the physical channel carrying Content[i] from Broadcast Server[j]. Once WRF[k] is calculated, the weight for Content[i] from Broadcast Server[j] (WContent[i]) can be calculated by a function f. This function combines WRF[k] with other measures of the quality of Content[i], including, for example, encoding rate (ER[i]) of the content, timing, frequency of occurrence, or duration (T[i]) of the content, the user preference (P[i]) of the content, and/or the cost (C[i]) of the content. Now the weight for broadcast server j (WBroadcastServer[j]) is calculated by summing the weights of the contents broadcast by the broadcast server. Then, a rank (BroadcastServerRank[j]) can be determined for broadcast server j by means of a function g that combines the weight for the broadcast server with other measures of the quality of the broadcast server, including, for example, a performance (Performance[j,t]) selected by the user (if any performance is selected), and/or an access terminal state with respect to the broadcast server (idle or connected to broadcast server j). The ranks determined by the access terminal enable it to place the broadcast servers it monitors in rank order as illustrated in FIG. 4, and to identify a best broadcast server (BestBroadcastServer[t]) having the maximum rank. The ranking can be changed from time to time according to whether a performance is selected by the user, and whether the time for the performance has come or passed.

The process according to one embodiment is illustrated in the following pseudo code:

```
Foreach Broadcast Server[j]
{
   Foreach Content[i] on Broadcast Server[j]
   {
     Foreach SoftCombineServer[k]
     {
        WRF[k]= Σ WRF[k]
     }
     WContent[i] = f(ER[i], T[i], P[i], C[i], WRFCombined[i], ... )
     WBroadcastServer[j] = Σ WContent[i]
   }
   BroadcastServerRank[j] = g(WBroadcastServer[j], Performance[j,t−1], ATState)
}
BestBroadcastServer[t] = MAX(BroadcastServerRank[j])
```

In this embodiment, the variables and values are given as:
m=Number of Broadcast Servers
t=current time
t−1=the previous time interval
i=the index of the Broadcast Content
j=the index of the broadcast server
k=the index of a soft combine server associated with content i
ER[i]=the Encoding Rate for Broadcast Content i
T[i]=the Timing/frequency/duration of Broadcast Content i
P[i]=the user Preference for Broadcast Content i
C[i]=the Cost of Broadcast Content i
WContent[i]=the Weight for Broadcast Content i
WRF[k]=the weight for RF for each SoftCombineServer associated with Broadcast Content i from Broadcast Server j
WRFCombined[i]=the Weight for RF for content I combined from all soft combine srevers
WBroadcastServer[j]=the Weight for Broadacast Server j
Performance[j,t]=the Broadcast Content Performance for j at time t
ATState=the State of the Access Terminal (idle or connected)
BroadcastServerRank[j]=the Rank of Broadcast Server j
BestBroadcastServer[t]=the Best Broadcast Server selection at time t
j=[1,m]

Figure 5:
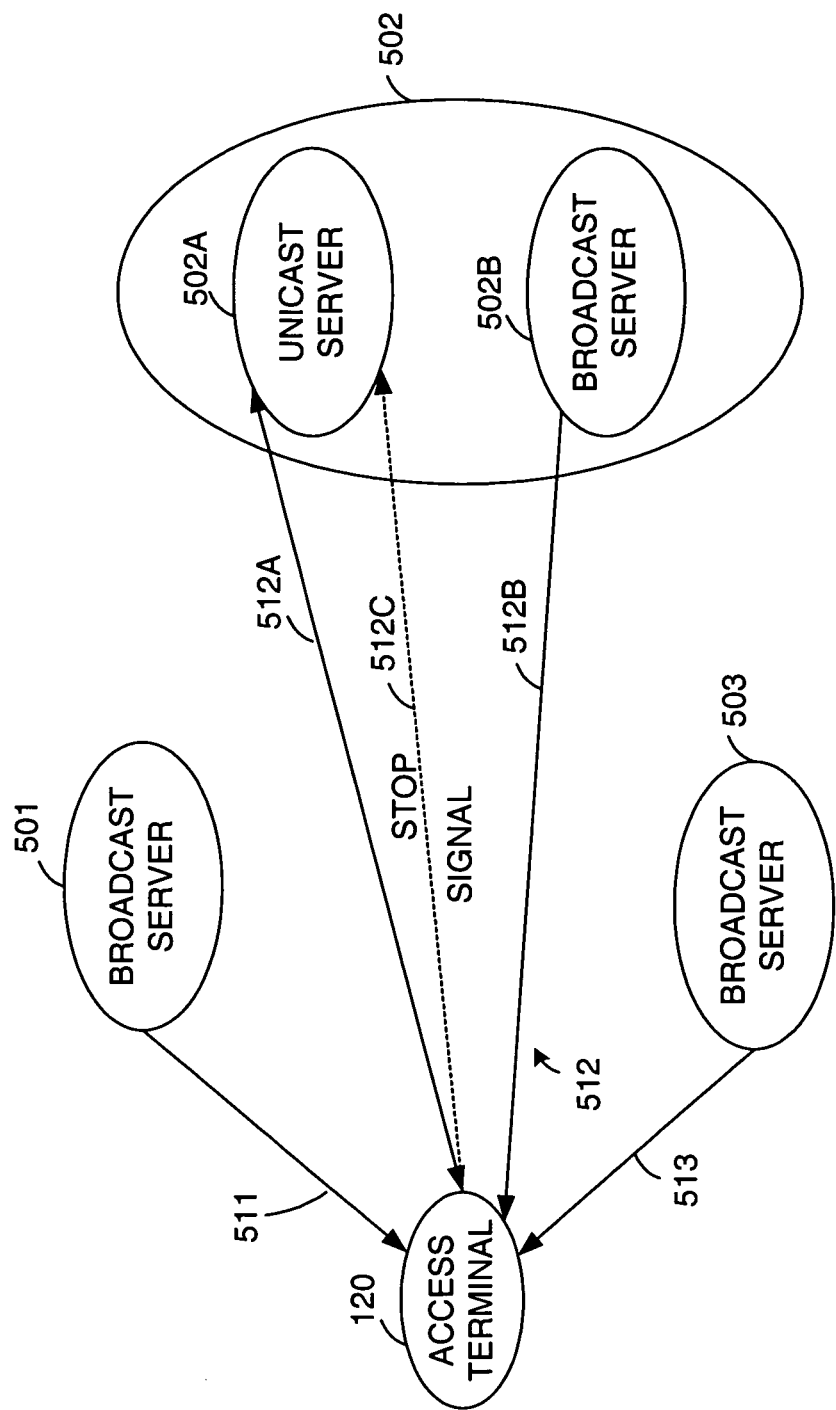
FIG. 5 is a diagram of a wireless broadcast environment in which an access terminal performs the process of evaluating and ranking broadcast servers while connected for a unicast call.

It may be the case that the access terminal performing the process as given above is in a connected state with a base transceiver station also performing as a broadcast server providing a wireless broadcast channel being monitored by the access terminal (ATState=connected to this server). For example, the access terminal may be connected to the base transceiver station for a unicast data call, such as a telephone call, while ranking broadcast servers. This environment is illustrated in FIG. 5. In this case, the reference numerals 501, 502, and 503 refer respectively to base transceiver stations performing also as broadcast servers being evaluated and ranked while the access terminal 120 is also connected to the base transceiver station 502 for a unicast data call. The two roles performed by the base transceiver station 502 with respect to the access terminal 120 are represented as separate servers (502A and 502B) for the sake of illustration only. The reference numerals 511, 512, and 513 refer to the physical channels by which the base transceiver stations communicate with the access terminal 120. The link 512 has a bi-directional component 512A to signify that the access terminal is connected to the unicast server 502A and a unidirectional component 512B to signify that the broadcast communication from the broadcast server 502B is unidirectional, carried on the forward traffic link only. The choice of the best broadcast server is made by the access terminal according to the process illustrated above. Preferably, the process is performed by the access terminal 120 periodically during each of a succession of time intervals. For a given time interval, if the access terminal 120 is interested in monitoring broadcast content provided by the broadcast server 502B during a particular time interval, it sends a stop transmission signal 512C to the unicast server 502A for that time interval. Note, the stop transmission signal may be needed if the uni-cast server is not within the set of servers from which the access terminal desires to receive broadcasts. The stop transmission signal 512C is provided on one of the reverse link channels between the access terminal 120 and the base transceiver station 502. This causes the unicast server 502A to stop transmitting unicast data to the access terminal 120 during that time interval. Preferably, the duration of the stop transmission signal is one time interval.

The access terminal may be enabled to measure the time interval and perform the interruption by adapting timing and traffic control functions inherent in the architecture 200 and using a reverse link control channel to transmit the stop transmission signal.

The previous description of the disclosed embodiments is provided to enable any person skilled in the art to make or use an access terminal according to this specification. Various modifications will be readily apparent to those skilled in the art, and the principles defined herein may be applied to other embodiments without departing from the spirit or scope of these teachings. Thus, the appended claims are not intended to be limited to the embodiments shown herein but are to be accorded the widest scope consistent with the principles and novel features disclosed herein.

What is claimed is:

1. In a multiple-access network, a method of operating an access terminal to receive broadcast content, comprising:
   receiving a plurality of transmissions of contents provided by a plurality of broadcast servers;
   determining a broadcast server weight for each of the broadcast servers by:
      determining a weight for each content provided by the broadcast server comprising:
         determining a weight based upon one or more measured qualities on each of the plurality of transmissions of contents provided by each of the plurality of broadcast servers for each content provided by the broadcast server; and
         combining a transmission weight comprising a combination of determined weights of the plurality of transmissions of contents with a value for at least one quality measure of the content to yield a weight for the content; and
      combining weights for contents provided by the broadcast server to yield the broadcast server weight; and
   ranking the broadcast servers by their respective broadcast server weights.

2. The method of claim 1, further comprising:
   decoding a transmission of content broadcast by the highest-ranking broadcast server.

3. The method of claim 1, further including decoding a transmission of content broadcast by a broadcast server selected from the ranked broadcast servers.

4. The method of claim 1, in which determining a weight for each content comprises:
   determining the weight based upon one or more measured qualities for each transmission of the content;
   combining the weights for transmissions of the content to yield the transmission weight for the content;
   determining the value for at least one quality measure of the content; and
   combining the transmission weight for the content with the value for at least one quality measure to yield the weight for the content.

5. The method of claim 4, wherein each broadcast server is associated with a soft combine group of at least one serving server, in which each serving server of a soft combine group provides a transmission of a respective content provided by a broadcast server associated with the soft combine group, and wherein determining the weight for each transmission comprises:
   determining a value for at least one quality measure of the transmission for serving servers of a soft combine group.

6. The method of claim 5, wherein the at least one quality measure of the transmission is selected from the group including transmission type, transmission condition, and transmission power.

7. The method of claim 5, wherein the at least one quality measure of the content is selected from the group including content encoding rate, content timing, content cost, and content priority.

8. The method of claim 5, in which the transmissions are on forward traffic channels received by the access terminal.

9. The method of claim 8, further comprising:
   interrupting a unicast transmission on one of the forward traffic channels to receive a broadcast transmission on the forward traffic channel.

10. The method of claim 9, wherein interrupting includes periodically interrupting.

11. An access terminal for use in a wireless multiple-access network, comprising:
   an Radio Frequency (RF) section to receive a plurality of transmissions of contents provided by a plurality of broadcast servers;
   a rank determination module configured to determine a broadcast server weight for each of the broadcast servers by:
      determining a weight for each content provided by the broadcast server comprising:
         determining a weight based upon one or more measured qualities on each of the plurality of transmissions of contents provided by each of the plurality of broadcast servers for each content provided by the broadcast server; and
         combining a transmission weight comprising a combination of determined weights for transmissions of the content with a value for at least one quality measure of the content to yield a weight for the content; and
      combining weights for contents provided by the broadcast server to yield the broadcast server weight; and
   a data structure configured to arrange the broadcast servers by their respective broadcast server weights.

12. The access terminal of claim 11, further comprising:
   means for decoding a transmission of content broadcast by the highest-ranking broadcast server.

13. The access terminal of claim 11, further comprising:
   means for decoding a transmission of content broadcast by a broadcast server selected from the ranked broadcast servers.

14. The access terminal of claim 11, in which the rank determination module comprises:
   means for determining the weight based upon one or more measured qualities for each transmission of the content;
   means for combining the weights for transmissions of the content to yield the transmission weight for the content;
   means for determining the value for at least one quality measure of the content; and
   means for combining the transmission weight for the content with the value for at least one quality measure the content to yield the weight for each content.

15. The access terminal of claim 14, wherein:
   each broadcast server is associated with a soft combine group of at least one serving server;
   each serving server of a soft combine group provides a transmission of a respective content provided by a broadcast server associated with the soft combine group; and
   the rank determination module comprises: means for determining a value for at least one quality measure of the transmission for each serving server of a soft combine group.

16. The access terminal of claim 15, wherein the at least one quality measure of the transmission is selected from the group including transmission type, transmission condition, and transmission power.

17. The access terminal of claim 15, wherein the at least one quality measure of the content is selected from the group including content encoding rate, content timing, content cost, and content priority.

18. The access terminal of claim 15, in which the transmissions are on forward traffic channels of the wireless multiple-access network.

19. The access terminal of claim 18, further including means for interrupting a unicast transmission on one of the forward traffic channels to receive a broadcast transmission on the forward traffic channel.

20. The method of claim 19, in which means for interrupting is for periodically interrupting the unicast transmission.

21. In a cellular network, a method of operating an access terminal to receive broadcast content, comprising:
  receiving a plurality of transmissions of contents provided by a plurality of broadcast servers through a plurality of base transceiver stations of the network;
  determining a transceiver station weight for each of the base transceiver stations by:
    determining a weight for each content provided by the base transceiver station comprising:
      determining a weight based upon one or more measured qualities on each of the plurality of transmissions of contents provided by each of the plurality of broadcast servers for each content provided by the base transceiver station;
      combining a transmission weight comprising a combination of determined weights for transmissions of the content with a value for at least one quality measure of the content to yield a weight for the content; and
    combining weights of contents' provided by the base transceiver station to yield the base transceiver station weight; and
  ranking the base transceiver stations by their respective base transceiver station weights.

22. The method of claim 21, further comprising:
  decoding a transmission of content broadcast by the highest-ranking base transceiver station.

23. The method of claim 21, further comprising:
  decoding a transmission of content broadcast by a base transceiver station selected from the ranked base transceiver stations.

24. The method of claim 21, in which determining a weight for each content comprises:
  determining the weight based upon one or more measured qualities for each transmission of the content;
  combining weights of transmissions of the content to yield the transmission weight for the content;
  determining the value for at least one quality measure of the content; and
  combining the transmission weight for the content with the value for at least one quality measure to yield the weight for the content.

25. The method of claim 24, wherein:
  each base transceiver station is associated with a soft combine group of at least one serving sector;
  each serving sector of a soft combine group provides a transmission of a respective content provided by a base transceiver station associated with the soft combine group; and
  determining the weight for each transmission comprises:
    for serving sectors of a soft combine group, determining a value for at least one quality measure of the transmission.

26. The method of claim 25, wherein the at least one quality measure of the transmission is selected from the group including transmission type, transmission condition, and transmission power.

27. The method of claim 25, wherein the at least one quality measure of the content is selected from the group including content encoding rate, content timing, content cost, and content priority.

28. The method of claim 25, in which the transmissions are on forward traffic channels received by the access terminal.

29. The method of claim 28, further including interrupting a unicast transmission on one of the forward traffic channels to receive a broadcast transmission on the forward traffic channel.

30. The method of claim 29, In which interrupting includes periodically interrupting.

31. An access terminal for use in a wireless multiple access network, comprising:
  an Radio Frequency (RF) section to receive a plurality of transmissions of contents provided by a plurality of base transceiver stations;
  a rank determination module configured to determine a transceiver station weight for each of the base transceiver stations by:
    determining a weight for each content provided by the base transceiver station comprising:
      determining a weight based upon one or more measured qualities on respective one or more forward link broadcast channels for each content provided by the base transceiver station;
      combining a transmission weight comprising a combination of determined content weights for transmissions of the content with a value for at least one quality measure of the content to yield a weight for the content; and
    combining weights of contents provided by the base transceiver station to yield the base transceiver station weight; and
  a data structure configured to arrange the base transceiver stations by their respective base transceiver station weights.

32. The access terminal of claim 31, further including means for decoding a transmission of content broadcast by the highest-ranking base transceiver station.

33. The access terminal of claim 31, further including means for decoding a transmission of content broadcast by a base transceiver station selected from the ranked base transceiver stations.

34. The access terminal of claim 31, in which the rank determination module includes:
  means for determining the weight based upon one or more measured qualities for each transmission of the content;
  means for combining weights of transmissions of the content to yield the transmission weight for the content;
  means for determining the value for at least one quality measure of the content; and
  means for combining the transmission weight for the content with the value for at least one quality measure the content to yield the weight for each content.

35. The access terminal of claim 34, wherein:
each base transceiver station is associated with a soft combine group of at least one serving sector:
each serving sector of a soft combine group provides a transmission of a respective content provided by a base transceiver station associated with the soft combine group; and
the rank determination module comprises:
means determining a value for at least one quality measure of the transmission for each serving sector of a soft combine group.

36. The access terminal of claim 35, wherein the at least one quality measure of the transmission is selected from the group including transmission type, transmission condition, and transmission power.

37. The access terminal of claim 35, wherein the at least one quality measure of the content is selected from the group including content encoding rate, content timing, content cost, and content priority.

38. The access terminal of claim 35, in which the transmissions are on forward traffic channels of the wireless multiple-access network.

39. The access terminal of claim 38, further including means for interrupting a unicast transmission on one of the forward traffic channels to receive a broadcast transmission on the forward traffic channel.

40. The method of claim 39, in which means for interrupting is for periodically interrupting the unicast transmission.

41. A non-transitory processor-readable memory including processor-executable instructions encoded thereon for causing the processor to execute a method of operating an access terminal in a wireless multiple-access network, the method comprising the steps of:
receiving a plurality of transmissions of broadcast contents provided by a plurality of base transceiver stations of the network;
determining a base transceiver station weight for each of the base transceiver stations by:
determining a weight for each content provided by the base transceiver stations comprising:
determining a weight based upon one or more measured qualities on each of the plurality of transmissions of contents provided by each of the plurality of base transceiver stations for each content provided by the base transceiver station; and
combining a transmission weight comprising a combination of determined weights of the plurality of transmissions of contents with a value for at least one quality measure of the content to yield a weight for the content; and
combining weights of contents provided by the base transceiver station to yield the base transceiver station weight; and
ranking the base transceiver stations by their respective base transceiver station weights.

42. An access terminal for use in a wireless multiple-access network, comprising:
means for receiving a plurality of transmissions of broadcast contents provided by a plurality of base transceiver stations of the network;
means for determining a weight for each of the base transceiver stations by:
means for determining a weight for each content provided by the base transceiver stations comprising:
means for determining a base transceiver station weight based upon one or more measured qualities on each of the plurality of transmissions of contents provided by each of the plurality of base transceiver station for each content provided by the base transceiver station; and
means for combining a transmission weight comprising a combination of determined weights of the plurality of transmissions of contents with a value for at least one quality measure of the content to yield a weight for the content; and
means for combining weights of contents provided by the base transceiver station to yield the base transceiver station weight; and
means for ranking the base transceiver stations by their respective base transceiver station weights.

* * * * *